Figure 1:
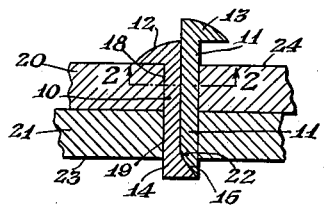

April 15, 1941. W. DUBILIER 2,238,463
FASTENING DEVICE, PARTICULARLY RIVETS
Filed Dec. 24, 1938

INVENTOR.
William Dubilier
BY
J. Oppenheimer
ATTORNEY.

Patented Apr. 15, 1941

2,238,463

UNITED STATES PATENT OFFICE 2,238,463

FASTENING DEVICE, PARTICULARLY RIVETS

William Dubilier, New Rochelle, N. Y.

Application December 24, 1938, Serial No. 247,558

9 Claims. (Cl. 85—38)

This invention relates to a fastening device, in particular rivet, for fastening together two or more pieces of any suitable shape and material, particularly plates or sheets of metal.

It is an object of the invention to provide a fastening device by which two or more pieces, such as plates or sheets of metal, are inseparably connected.

It is another object of the invention to provide a fastening device, particularly rivet, by which two or more pieces, such as plates or sheets of metal, are inseparably connected without particular preparation of the pieces except drilling or punching holes in the places where the fastening device has to be applied. In particular, no screw thread has to be provided in such a hole.

It is still another object of the invention to provide a fastening device, particularly rivet, for inseparably connecting two or more pieces, such as plates or sheets of metal, without further preparation of the places where the device is to be applied, particularly without forming a screw thread, and without application of heat to the rivet. The fastening device can simply be applied by blows with a suitable instrument, such as a hammer.

It is still a further object of the invention to provide a fastening device, particularly rivet, for inseparably connecting two or more pieces, such as plates or sheets of metal, in cases where the pieces to be assembled are accessible only from one side. The fastening device can be put in place and caused to inseparably connect the pieces without application of heat, for instance by hammer blows on the accessible side of the pieces to be connected, and a connection of those pieces is achieved which cannot be separated except by destroying the fastening device or all the pieces connected thereby.

According to a particular object of the invention a fastening device is given which, after application, results in a self-heading rivet.

These and other objects of the invention will be more clearly understood when the specification proceeds with reference to the drawing in which some preferred exemplifications of the invention are shown without limiting the latter thereto.

Figure 3:
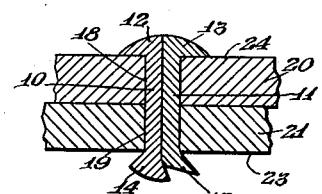
Figure 2:
Figure 4:
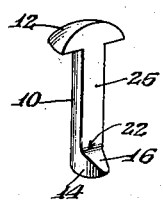
Figure 6:
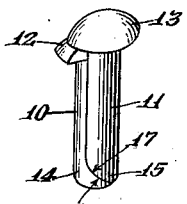
Figure 5:
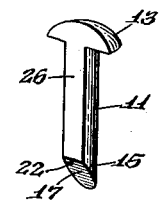
Figure 7:
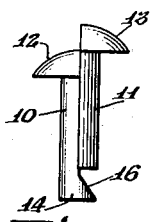
Figure 8:
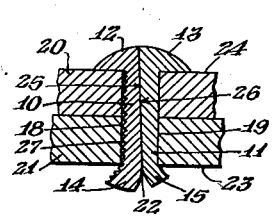
Figure 9:
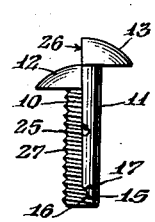
Figure 10:
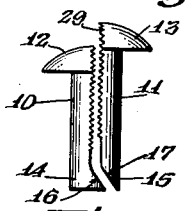
Figure 11:
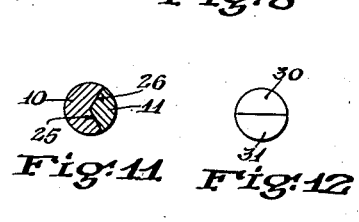
Figure 12:
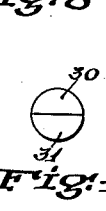
Figure 13:
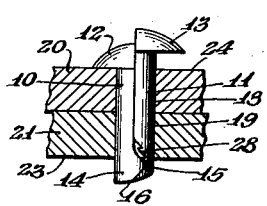
Figure 14:
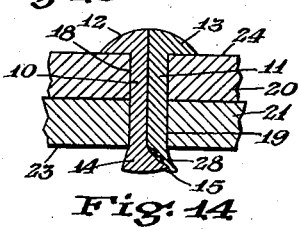

In the drawing Fig. 1 shows a cross section through two pieces to be connected and a rivet according to the invention put into their registering holes, Fig. 2 a cross section along lines 2—2 in Fig. 1, Fig. 3 the two pieces and the rivet, after it is driven into its locking position, Figs. 4 and 5 perspective views of the two portions forming the new rivet and Fig. 6 in perspective view the two portions assembled in their initial relative position, Fig. 7 a side elevation of a modification of a rivet according to the invention, Fig. 8 in cross section another modification of a rivet according to the invention in its locking position, Figs. 9 and 10 in side elevation other modifications of a rivet according to the invention, Fig. 11 a cross section through the shank and Fig. 12 in a view from below another modification of a rivet according to the invention, and Figs. 13 and 14 in side elevations and longitudinal sections respectively still another modification of a rivet according to the invention in the initial and locking positions respectively of its portions.

Identical reference numbers in the figures indicate similar parts.

For reasons of simplification the fastening device according to the invention will be referred to as a rivet in the following specification.

Many suggestions have been made for connecting two or more pieces by means of rivets and other fastening devices which can be applied from one side of the pieces only, and the shape of which is changed during application so as to establish the desired inseparable connection.

So-called expansion bolts have been suggested comprising a hollow shaft provided with a head on one end, into the other free end of which a wedge can be driven, in order to expand this end after the bolt has been placed in a connecting position. It has also been suggested to taper such hole at the free end of the hollow shaft, so as to give it a wedge shape, and to drive a pin into the hole, so as to expand the wedge shaped free end of the shank.

All these structures are relatively complicated and expensive.

Another suggestion concerned an explosion rivet and provided its shank at its free end with a chamber or recess to receive an explosive. Upon application of sufficient heat to the head of the rivet, the explosive was caused to detonate, and by the pressure so created in the free end of the rivet this end was expanded. It is obvious that such rivets are to be handled carefully in order to avoid unintended detonation of the explosive, and that the free end of the shank might be damaged and weakened by the explosion.

The invention does away with these drawbacks of known rivets and presents a structure easily and cheaply to be made and to be applied in a simple way, such as by a few hammer blows.

Referring to Figs. 1 to 6 of the drawing a rivet is formed of a number of parts, in this exemplification of two parts each consisting of a shank portion 10 and 11 and a head portion 12 and 13, respectively.

As to be seen from the horizontal cross section of Fig. 2 the two shank portions 10, 11 supplement each other to a preferably cylindrical full and solid shank and the head portions 12, 13 supplement each other to a preferably circular full head of usual shape.

The free ends of the shank portions 10, 11 are differently shaped. The free end portion 14 is enlarged and wedge-shaped on its inside at 16 whereas the free end portion 15 decreases in cross section, leaving an inclined surface 17.

The thus shaped portions of the rivet are assembled in the way as shown in Figs. 1 and 6 in an initial relative position, in which the head of portion 11 protrudes substantially beyond the head of the other portion 10 and the differently shaped free ends 14, 15 preferably contact each other along the inclined surfaces 16, 17.

The two rivet portions may be connected in their initial relative position by any suitable cement or varnish in order to facilitate the handling of the rivet.

The thus constructed and assembled rivet is then inserted in registering holes 18, 19 of two plates or sheets 20, 21 of any material, such as metal and in particular aluminum, as it is shown in Fig. 1. By applying a few hammer blows upon the protruding head portion 13 of the rivet, this portion together with the shank portion 11 is driven in and thereby the free end portions 14, 15 are bent outside due to the wedging action of the two cooperating surfaces 16, 17.

The final locking position and shape of the driven in rivet is shown in Fig. 3. Obviously the two head portions 12, 13 are tightly pressed against the outer surface 24 of the plate 20 and constitute a complete rivet head. The free ends 14, 15 of the shanks are bent or wedged outside, forming a kind of second rivet head, and tightly pressed against the outer edge of the hole 19 of plate 21. Thereby a firm connection of the two plates 20, 21 is established which can only be loosened by destroying the rivet or the plates near the places where the rivet is applied.

No particular preparation of the holes 18, 19 is required. They are e. g. drilled or punched in any of the usual ways and preferably bevelled on their outer ends, as it is usual with holes for ordinary rivets applied by forming a head on their free shank end in the heat.

As is to be seen in Fig. 1, the inclined surfaces 16, 17 start at the angle line 22 which lies advantageously somewhat higher than level with the lower outer surface 23 of the plate 21. Thereby the mutual outward wedging action of the free ends of the two shank portions is started somewhat above the outer surface 23 of and inside the plate 21, and the corresponding portions of the shanks 10, 11 are tightly pressed against the outer end of hole 19. If this end be bevelled, the shank portions are tightly pressed against the thus shaped end.

In riveting together two pieces they are connected by cooperation of the head and the transformed free end of the shaft of the rivet. A shearing action is exerted upon the shaft substantially in the planes lying flush with the outer surfaces 23 and 24 of the plates. It is obvious that a bolt according to this invention offers equal resistance against such shearing action in the plane through surface 24 as does a normal rivet, because the two portions 10, 11 of the shank supplement each other in the locking position to a full and solid cylindrical bolt. It is further obvious that also on the places where the free end portions 14, 15 of the shank portions are bent outwardly they supplement each other in level with the outer surface 23 to a full strength cylindrical bolt, because the tapered end portion 15 of the shank portion 11 has left the hole 19 for a considerable length after the shank portion 11 has been driven in. Consequently, at this place also a full cross section of the shank is resistant to the shearing action.

It is further obvious that the two head portions 12, 13 act in their fastening position like a normal rivet head, while the outwardly wedged end portions 14, 15 result in a lock of extreme strength, because the outwardly bent portions 14 is of even larger cross section than the corresponding portion of a normal rivet, whereas the outwardly bent end portion 15 is, over a considerable length, of about the same cross section as the corresponding portion of a normal rivet.

Consequently, the applied rivet according to the invention offers the same resistance to rupture as a normal rivet.

In the strength of the riveted connections of the type described herein, the friction between the two pieces 20, 21 connected by the rivet plays a considerable part too. On account of the fact that the wedging surfaces 16, 17 start at the angle line 22 above the level of the outer surface 23 inside the plate 21, these end parts of the shank portions are tightly pressed against the outer end of the hole 19 and virtually exert a wedging action upon it, thereby tightly pressing the plates 20, 21 together. Therefrom considerable friction results between these pieces, substantially equivalent to the friction caused by a normal rivet, the second head of which is formed in the heat and the shank of which contracts upon cooling thereby creating pressure and friction between the plates.

The shanks of ordinary rivets contract somewhat radially upon cooling and retreat from the cylindrical inside surface of the holes through which they have been threaded. With the present invention the shank can closely touch the inside surfaces of the holes, because no heat need be applied when the bolt is inserted and fastened in the holes, and consequently no cooling is needed and no contraction occurs. Notwithstanding this fact, high pressure is exerted upon the plates and friction is caused between them by the rivet according to the invention, as is the case with ordinary rivets, particularly if the conditions outlined above as to the proper position of angle line 22 are observed.

It will be appreciated from the above that a rivet according to the invention is simple in manufacture and application. The parts of which the new rivet consists can easily be made, for instance molded or punched, as is the case with ordinary one piece rivets. Cementing them together, if desired, is easily done by any self-hardening or other cement or varnish. The new rivet is easier put in place than an ordinary one, because no heat need be applied. The transforming of the free end of the shank portions into a locking head is obtained by a few hammer blows. Pneumatic or other hammering devices may also be used, as they are used in applying ordinary heated rivets. Whereas such ordinary rivets need some counter part to be applied on the backside of the pieces to be connected, no such implements are needed with the rivet according to the present invention. They can be applied to pieces which are accessible only from one side, as is the case for instance in the manufacture of closed hollow bodies, such as wings and other parts of airplanes.

A rivet according to the invention may be made of any desired and suitable material. Thus for instance iron, copper, aluminum and any alloys may be used which are of sufficient strength, but give in in the cold, when mechanical forces are applied thereto.

In general, any metal or alloy of sufficient strength can be used because their pliability depends, as is well known in the art, substantially on the dimensions in which they are used.

The two portions of the rivet are preferably of the same material; however, they can also be made of different materials or different grades or alloys of the same materials.

In Figs. 1 to 6 it has been assumed that the inclined surfaces 16, 17 contact each other when the portions of the rivet are in their initial relative position shown in Figs. 1 and 6. However, the surfaces may be inclined at different angles so that they do not touch each other or at least not over their entire area.

It is further assumed in the above exemplification that the two portions 14, 15 are of equal length. It remains within the scope of the invention to make these portions of different lengths, and in particular to shorten the tapered tongue 15 of the shank portion 11. In extreme cases this tongue may be omitted entirely, as shown in Figs. 7 and 8. It is essential for the invention that the portion 14 with its wedging surface 16 is present.

More satisfactory results particularly for heavily loaded connections are obtained however with the feature according to which a tongue 15 is provided, although its inclined surface 17 may not contact in full the surface 16 when the bolt is inserted in the holes 18, 19.

It has further been assumed in the above exemplification of the invention that the shank portions supplement each other to a cylinder and the contacting surfaces 25, 26 lie in the longitudinal axis of this cylinder. In order to press the circumferential surfaces of the shank portions 10, 11 as tightly as possible against the inside surfaces of the holes 18, 19, the surfaces 25, 26 may be slightly inclined as is shown in the side elevation of Figs. 8 and 9 in a somewhat exaggerated way for better showing. The angle at which the surfaces 25, 26 should be inclined should amount to a few degrees, e. g., 1 to 5 degrees only, depending upon the length of the shank and the coefficient of friction between the surfaces 25, 26. The longer the shank, the smaller the angle should be, and friction between the surfaces should always be present. It will be appreciated that in such a case the two portions when inserted in an offset initial position, corresponding to Figs. 1 and 6, will result in a smaller total diameter of the completed shank than is the case when the portion 11 is driven into its final locking position which is shown in Fig. 8. The shank can therefore easily be inserted into the holes and is expanded radially and tightly pressed against them when the portion 11 is driven into its final locking position, whereby the connection between the pieces is rendered still stronger.

In Figs. 7 and 8, the tongue 15 of piece 11 has been omitted for exemplification purposes. It is again assumed that the angle-line 22 lies advantageously somewhat above the outer surface 23 inside the plate 21.

In the above exemplification it has been assumed that the outer surfaces of the shank portions are relatively smooth. They can also be provided, according to a further feature of the invention, with slightly protruding portions of any shape.

Figs. 8 and 9 show a rivet the shank portion 10 of which is provided with a kind of screw thread 27 which may extend over the upper part of the shank only. In this feature of the invention a slight incline of the surfaces 25, 26 is preferable in order to facilitate the insertion of the rivet in the hole. In the initial relative position of the shank portions the outer diameter of the screw threads will be equal to or slightly smaller than the diameter of the holes 18, 19. If the portion 11 which is preferably provided with a smooth surface, is driven in, the shank expands radially and screw thread 27 is pressed into the inside walls of the holes 18, 19.

It is to be understood that the surfaces 25, 26 may lie in the longitudinal axis of the rivet and that the tongue 15 may either be shaped and arranged according to Figs. 1 and 6, or may not contact the enlarged portion 14, or may even be omitted as shown in Figs. 7, 8.

Sometimes and particularly if slightly inclined surfaces 25, 26 are used, it might be advisable to use, instead of smooth surfaces 25, 26, uneven, rough or serrated ones 29, as shown in Fig. 10, whereby the friction between the two shank portions and their tight connection when driven in final position can be increased, if need be.

It has been pointed out that a particular advantage of the invention consists in that the bolt as it is delivered from the factory, can be immediately applied without use of heat. Sometimes, particularly if shank portions of relatively large dimensions and great mechanical resistance are concerned, it might be advisable to heat the shank portions near their free ends in order to facilitate their deformation. In such a case the final connection is also obtained by hammering the protruding portion of the rivet into the holes from the accessible side of the pieces to be connected. Instead of applying heat, it is preferable to make the angle at which the surface 16 is inclined to the longitudinal axis of the rivet of such a magnitude that the desired outward wedging of the portion 14 by the end of the other shank portion 11 is obtained for mechanically highly resistant bolts too. It will be appreciated that the smaller this angle is, the easier can the other shank portion be driven into final locking position. Depending upon the purposes to which the rivet is put and upon the materials of which the pieces to be connected and the rivet portions consist, and depending upon the more or less, or not at all, bevelled shape of the outer end of the hole 19, this angle may be chosen between about 10° to about 30° and, if for instance aluminum is concerned, even up to about 45° to 50°. It is to be understood that the invention is in general not limited to any such angle, and that the surface 16 need not be a plane but may be curved, particularly as it is shown by way of example in Figs. 13 and 14.

It is also to be understood that the surfaces 25, 26 need not be planes but may be shaped as to be seen from the cross section of Fig. 11 through the shank of the rivet. In such case the free end portion 14 may advantageously be split longitudinally, for instance into two parts 30, 31, as it is shown in the view from the bottom of Fig. 12.

In order to additionally secure the shank portions in their final locking position, a grooved or toothed surface 28 may be used instead of a smooth surface 17, as it is shown in Fig. 13.

When the shank portion 11 is driven into its locking position, a tooth of surface 28 catches the inner edge of the wedged outward portion 14, as it is shown in Fig. 14, and prevents additionally any relative movement of the shank portions.

The portions 11 in Figs. 11, 13 and 14 are preferably of stiffer material than the portions 10; if the latter are, e. g., of aluminum, the former may be of iron or steel.

What I claim is:

1. A rivet comprising a number, two as a minimum, of substantially coextensive members having lengths exceeding the total thickness of parts to be joined, said members each comprising a head portion and a shank portion, said head portions to lie on one side of said parts and substantially complementing each other in the final interlocking position of said members, said shank portions substantially complementing each other in an initial offset relative position of said members for projecting said shank portions from the same side through aligned apertures in said parts, said shank portions being deformable adjacent to their free ends, a shank portion of one of said members being enlarged and substantially wedge-shaped on its inside adjacent to its free end, a shank portion of another of said members shaped at its free end to leave space for said enlarged portion in said initial position, the distance between the head portion and the inside end of the shaped free end of said latter shank portion substantially exceeding the distance between the head portion and the inside end of said enlargement of said first mentioned shank portion, so that upon projecting said members in their initial position through said apertures and upon application of pressure on said other member to bring about said final position of the members, by coaction of said enlarged and shaped end portions the free ends of all the shank portions are deformed and spread beyond the limits of said apertures to interlock said parts.

2. A rivet comprising a number, two as a minimum, of substantially coextensive members having lengths exceeding the total thickness of parts to be joined, said members each comprising a head portion and a shank portion, said head portions to lie on one side of said parts and substantially complementing each other in the final interlocking position of said members, said shank portions substantially complementing each other in an initial offset relative position of said members for projecting said shank portions from the same side through aligned apertures in said parts, said shank portions being deformable adjacent to their free ends, a shank portion of one of said members being enlarged and substantially wedge-shaped on its inside adjacent to its free end, a shank portion of another of said members tapered at its free end to leave space for said enlarged portion in said intial position, the distance between the head portion and the inside end of said tapered free end of said latter shank portion substantially exceeding the distance between the head portion and the inside end of said enlargement of said first mentioned shank portion, so that upon projecting said members in their initial position through said apertures and upon application of pressure on said other member to bring about said final position of the members, by coaction of said enlarged and tapered end portions the free ends of all the shank portions are deformed and spread beyond the limits of said apertures to interlock said parts.

3. A rivet comprising a number, two as a minimum, of substantially coextensive members having lengths exceeding the total thickness of parts to be joined, said members each comprising a head portion and a shank portion, said head portions to lie on one side of said parts and substantially complementing each other in the final interlocking position of said members, said shank portions substantially complementing each other in an intial offset relative position of said members for projecting said shank portions from the same side through aligned apertures in said parts, said shank portions being deformable adjacent to their free ends, a shank portion of one of said members being enlarged and substantially wedge-shaped on its inside adjacent to its free end, a shank portion of another of said members provided with a blunt end to lie substantially in front of said enlarged portion in said initial position, the distance between the head and blunt end of said latter shank portion substantially exceeding the distance between the head portion and the inside end of said enlargement of said first mentioned shank portion, so that upon projecting said members in their initial position through said apertures and upon application of pressure on said other member to bring about said final position of the members, by coaction of said enlarged and blunt end portions the free ends of all the shank portions are deformed and spread beyond the limits of said apertures to interlock said parts.

4. A rivet comprising a number, two as a minimum, of substantially coextensive members having lengths exceeding the total thickness of parts to be joined, said members each comprising a head portion and a shank portion, said head portions to lie on one side of said parts and substantially complementing each other in the final interlocking position of said members, said shank portions substantially complementing each other in an initial offset relative position of said members for projecting said shank portions from the same side through aligned apertures in said parts, said shank portions being deformable adjacent to their free ends, a shank portion of one of said members being enlarged and substantially wedge-shaped on its inside adjacent to its free end, a minor part of said enlargement to lie within an aperture in said initial position, the length of a shank portion of another of said members substantially exceeding the distance between the inside end of said enlargement and the head portion of said first mentioned shank portion, so that upon projecting said members in their initial position through said apertures and upon application of pressure on said other member to bring about said final position of the members, by coaction of said enlarged and shaped end portions the free ends of all the shank portions are deformed and spread beyond the limits of said apertures to interlock said parts.

5. A rivet comprising a number, two as a minimum, of substantially coextensive longitudinal members contacting each other along surfaces slightly inclined against their longitudinal direction and having lengths exceeding the total thickness of parts to be joined, said members each comprising a head portion and a shank portion, said head portions to lie on one side of said parts and substantially complementing each other in the final interlocking position of said members, said shank portions substantially complementing each other in an initial offset relative position of said members for projecting said shank portions from the same side through aligned apertures in said parts, said shank portions being deformable adjacent to their free ends, a shank portion of one of said members being enlarged and substantially wedge-shaped on its inside adjacent to its free end, a shank portion of another of said members shaped at its free end to leave space for said enlarged portion in said initial position, the distance between the head portion and the inside end of the shaped free end of said latter shank portion substantially exceeding the distance between the head portion and the inside end of said enlargement of said first mentioned shank portion, so that upon projecting said members in their initial position through said apertures and upon application of pressure on said other member to bring about said final position of the members, by coaction of said enlarged and shaped end portions the free ends of all the shank portions are deformed and spread beyond the limits of said apertures to interlock said parts.

6. A rivet comprising a number, two as a minimum, of substantially coextensive longitudinal members contacting each other along surfaces slightly inclined against their longitudinal direction and having lengths exceeding the total thickness of parts to be joined, said members each comprising a head portion and a shank portion, at least one of said shank portions being ridged on its outside, said head portions to lie on one side of said parts and substantially complementing each other in the final interlocking position of said members, said shank portions substantially complementing each other in an initial offset relative position of said members for projecting said shank portions from the same side through aligned apertures in said parts, said shank portions being deformable adjacent to their free ends, a shank portion of one of said members being enlarged and substantially wedge-shaped on its inside adjacent to its free end, a shank portion of another of said members shaped at its free end to leave space for said enlarged portion in said initial position, the distance between the head portion and the inside end of the shaped free end of said latter shank portion substantially exceeding the distance between the head portion and the inside end of said enlargement of said first mentioned shank portion, so that upon projecting said members in their initial position through said apertures and upon application of pressure on said other member to bring about said final position of the members, by coaction of said enlarged and shaped end portions the free ends of all the shank portions are deformed and spread beyond the limits of said apertures to interlock said parts.

7. A rivet comprising a number, two as a minimum, of substantially coextensive longitudinal members having lengths exceeding the total thickness of parts to be joined, said members each comprising a head portion and a shank portion, said head portions to lie on one side of said parts and substantially complementing each other in the final interlocking position of said members, said shank portions substantially complementing each other in an initial offset relative position of said members for projecting said shank portions from the same side through aligned apertures in said parts and complementing each other in said final position to a substantially solid shank closely fitting into said apertures, said shank portions being bendable adjacent to their free ends, a shank portion of one of said members being enlarged and substantially wedge-shaped on its inside adjacent to its free end, another of said members having a shank portion shaped at its free end to leave space for said enlarged portion in said initial position and the head portion projecting outside beyond the head portion of said first mentioned member in said initial position, the distance between the head portion and the inside end of the shaped free end of said latter shank portion substantially exceeding the distance between the head portion and the inside end of said enlargement of said first mentioned shank portion, so that upon projecting said members in their initial position through said apertures and upon application of pressure on said projecting head portion to bring about said final position of the members, by coaction of said enlarged and shaped end portions the free ends of all the shank portions are wedged outwardly and spread beyond the limits of said apertures to interlock said parts.

8. A rivet for joining two or more parts having registering apertures, comprising two co-extensive members, each of said members comprising a head portion to lie on the same side of said parts and a shank portion of a length considerably exceeding the total thickness of said parts, a shank portion of a first of said members being enlarged and substantially wedge-shaped on its inside adjacent to its free end, a shank portion of a second of said members shaped at its free end to leave space for said enlarged portion, the distance of said shaped end from the head portion of said second member considerably exceeding the distance of said enlargement from the head portion of said first member, said members offset in an inital relative position wherein their shank portions substantially complement each other and closely fit into said apertures, so that upon projecting said members in their initial relative position through said apertures and upon application of pressure on said second member, by coaction of said enlarged and shaped end portions the free ends of said shank portions are deformed and spread beyond the limits of said apertures to interlock said parts.

9. A rivet for inseparably connecting two or more pieces of the type of sheets or plates accessible from one side only, comprising a member having a head and a substantially cylindrical shank of a length substantially exceeding the total thickness of said pieces and closely fitting into their registering holes, said member divided longitudinally into a number, two as a minimum, of portions each comprising a shank portion bendable adjacent to its free end, a first of said shank portions being enlarged at its free end and wedge-shaped on its inside, a second of said shank portions being considerably longer than said first shank portion, said portions having a first relative position for entering the shank of the rivet into the registering holes from the accessible side, and a second relative position in which the rivet projected through the holes is locked and connects said pieces inseparably, said shank portions in their first relative position complementing each other substantially to a cylindrical shank, the bendable ends of said shank portions being wedged outwardly to form a locking head in said second relative position upon driving in said complementary portions.

WILLIAM DUBILIER.